US012578587B2

(12) United States Patent
Milster et al.

(10) Patent No.: US 12,578,587 B2
(45) Date of Patent: Mar. 17, 2026

(54) FREEFORM SURFACE HAVING A DIFFRACTIVE PATTERN AND A METHOD AND SYSTEM FOR FORMING A DIFFRACTIVE PATTERN ON A FREEFORM SURFACE

(71) Applicant: Arizona Board of Regents on Behalf of the University of Arizona, Tucson, AZ (US)

(72) Inventors: Thomas D. Milster, Tucson, AZ (US); Lee C. Johnson, Tucson, AZ (US); Eduardo Bendek, San Francisco, CA (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 873 days.

(21) Appl. No.: 17/056,180

(22) PCT Filed: May 18, 2019

(86) PCT No.: PCT/US2019/033013
§ 371 (c)(1),
(2) Date: Nov. 17, 2020

(87) PCT Pub. No.: WO2019/222719
PCT Pub. Date: Nov. 21, 2019

(65) Prior Publication Data
US 2021/0271102 A1 Sep. 2, 2021

Related U.S. Application Data

(60) Provisional application No. 62/673,705, filed on May 18, 2018.

(51) Int. Cl.
*G02B 27/42* (2006.01)
*G02B 5/18* (2006.01)
(Continued)

(52) U.S. Cl.
CPC ....... *G02B 27/4205* (2013.01); *G02B 5/1814* (2013.01); *G02B 5/1857* (2013.01); *G02B 23/02* (2013.01); *G06T 5/80* (2024.01)

(58) Field of Classification Search
None
See application file for complete search history.

(56) References Cited

U.S. PATENT DOCUMENTS 5,555,129 A * 9/1996 Konno ................... G02B 27/46
359/569
7,210,803 B2 * 5/2007 Matsunaga ........ G02B 27/0172
359/857
(Continued)

FOREIGN PATENT DOCUMENTS

WO 2008020899 A2 2/2008

OTHER PUBLICATIONS

International Search Report and Written Opinion dated Sep. 20, 2019 in co-pending PCT Application No. PCT/US2019/033013.
(Continued)

*Primary Examiner* — Quan Pham
(74) *Attorney, Agent, or Firm* — Thomas | Horstemeyer, LLP

(57) ABSTRACT

An optical device comprising a freeform optical surface having a diffractive pattern formed thereon and a method and system for forming a diffractive pattern on a freeform optical surface are provided. The diffractive pattern can be formed with sufficient precision that the optical device is suitable for use in a telescope used in astrometry for exoplanet sub-micro-arcsecond resolution.

16 Claims, 14 Drawing Sheets

(51) Int. Cl.
    *G02B 23/02*       (2006.01)
    *G06T 5/80*        (2024.01)

(56)        References Cited

U.S. PATENT DOCUMENTS

| | | |
|---|---|---|
| 9,146,152 B2 | 9/2015 | Ko |
| 2002/0080476 A1* | 6/2002 | Cerutti-Maori ........ G02B 23/06 |
| | | 359/857 |
| 2006/0056065 A1 | 3/2006 | Schilling et al. |
| 2008/0297909 A1* | 12/2008 | Comstock, II ........... G02B 5/08 |
| | | 359/601 |
| 2011/0090389 A1 | 4/2011 | Saito |
| 2014/0071263 A1* | 3/2014 | Laguarta Bertran .. G01B 11/24 |
| | | 348/79 |

| | | |
|---|---|---|
| 2015/0323872 A1* | 11/2015 | Van De Kerkhof ........................ |
| | | G03F 7/70266 |
| | | 355/71 |
| 2016/0341948 A1* | 11/2016 | Tetaz .................. G02B 17/0642 |
| 2019/0339123 A1* | 11/2019 | Farsad ................... G01N 21/73 |

OTHER PUBLICATIONS

Bendek, et al., "High-precision Astrometry with a Diffractive Pupil Telescope", The Astrophysical Journal Supplement Series, 200.2 (Jun. 2012).

Bendek, et al., "Compatiblity of a diffractive pupil and coronagraphic imaging", Publications of the Astronomical Society of the Pacific, Feb. 2013.

Johnson, et al., "Freeform Diffractive Structure Printing Through Maskless Lithography", OSA Frontiers in Optics Conference Oct. 2014.

* cited by examiner

FREEFORM SURFACE HAVING A DIFFRACTIVE PATTERN AND A METHOD AND SYSTEM FOR FORMING A DIFFRACTIVE PATTERN ON A FREEFORM SURFACE

CROSS-REFERENCE TO RELATED APPLICATIONS

This application is a U.S. National Phase application under 35 U.S.C. § 371 of PCT international application PCT/US2019/033013 filed on May 18, 2019, which claims priority to, and the benefit of the filing date of, U.S. provisional application Ser. No. 62/673,705, filed on May 18, 2018 and entitled "A FREEFORM SURFACE HAVING A DIFFRACTIVE PATTERN AND A METHOD AND SYSTEM FOR FORMING A DIFFRACTIVE PATTERN ON A FREEFORM SURFACE," both of which are incorporated by reference herein in their entireties.

GOVERNMENT LICENSE RIGHTS

This invention was made with government support under Grant No. NNX15AQ49G, awarded by NASA. The government has certain rights in the invention.

BACKGROUND

Diffractive optical elements (DOEs) expand the optical designer's toolbox by providing capabilities such as beam separation, chromatic separation, imaging, aberration correction, and alignment, while reducing size and weight requirements. DOEs are commonly produced on planar geometries or on curved surfaces with rotational symmetry.

DOEs are fabricated using a multitude of methods, including lithography, diamond turning, and other subtractive manufacturing techniques. Lithographic fabrication techniques include mask-based lithography, electron-beam lithography and direct laser writing. There are many examples of binary DOE fabrication with mask-based lithography, but this method is limited to planar substrates, and printing non-binary features quickly increases cost and complexity with an increase in the number of lithography steps. Focused ion beam and electron-beam lithography are also effective in DOE fabrication and have the capability to produce sub-wavelength features with continuous surface relief via analog or multistep exposure on planar substrates. The necessity of a vacuum environment and slow throughput are characteristic of these methods.

Two-photon lithography is a form of direct laser writing that allows for exposure of grayscale features on the scale of 100-200 nanometers (nm) through two-photon absorption, but this process is slow without parallel printing beams or complex phasemasks tailored for a specific pattern.

Recently, diamond turning and milling have emerged as viable options to produce rotationally symmetric DOEs or mold masters for replicating DOEs, including non-planar substrates. However, fabrication of arbitrary diffractive patterns with diamond turning or milling remains challenging.

Direct laser writing lithography is the most viable option for practical prototype fabrication of DOEs in many cases, with the added benefit that continuous surface relief is straightforward by modulating the laser beam intensity. Laser lithography tools utilize either a pair of orthogonal translation stages under a fixed objective lens or a rotating sample stage with a writing head that scans in one direction. These systems tend to achieve the smallest spot sizes and best printing resolution with a direct tradeoff between resolution and exposure speed. Faster tools are achieved by scanning the beam in one direction and the stage in the other, or by scanning in both directions. Scanning can be achieved through the use of an acousto-optic deflector, a digital micromirror device (DMD) or a rotating polygonal mirror. An acousto-optic modulator is commonly used for modulation of the laser power.

Fabrication of arbitrary DOE patterns on non-planar surfaces presents significant challenges. The simplest form of a non-planar surface is a spherical surface with a rotationally symmetric profile. Fabrication of rotationally symmetric DOEs on spherical surfaces has been demonstrated using direct write laser lithography with focus adjustment via a mobile optical write head focusing the beam onto a rotating sample stage. Additionally, fabrication of a DOE on large-curvature optics has been demonstrated using a direct write system with the stage modified to tilt the sample to maintain focus about the surface as it is exposed. This system has demonstrated the fabrication of a continuous relief diffractive Fresnel lens on a spherical surface and is capable of producing an arbitrary pattern or profile on any surface profile, but it is prohibitively complex to do so.

Unfortunately, none of the methods described above is convenient for fabricating arbitrary DOEs on freeform substrates. Accordingly, a need exists for a method and system for fabricating DOEs on freeform substrates. A need also exists for optical devices comprising freeform substrates having one or more DOEs formed thereon with high precision.

SUMMARY

In accordance with one aspect, an optical device is provided that comprises a freeform optical surface having a preselected diffractive pattern disposed thereon.

In accordance with another aspect, the freeform optical surface is an optically transmissive surface.

In accordance with another aspect, the freeform optical surface comprises a reflective surface.

In accordance with another aspect, the freeform optical surface comprises a reflective surface and the preselected diffractive pattern is disposed on the reflective surface at a preselected location.

In accordance with another aspect, the freeform optical surface is a three-dimensional (3-D) surface that extends in X-, Y- and Z-directions of an X, Y, Z Cartesian coordinate system.

In accordance with another aspect, the 3-D surface is a non-spherical, non-planar surface.

In accordance with another aspect, the freeform optical surface is an aspherical mirror.

In accordance with another aspect, the preselected location at which the preselected diffractive pattern is disposed off-axis relative to an optical axis of the aspherical mirror, and the preselected diffractive pattern is disposed on a primary mirror surface of the aspherical mirror.

In accordance with another aspect, the aspherical mirror is a convex aspherical mirror and the preselected diffractive pattern is disposed on a primary mirror surface of the aspherical mirror.

In accordance with another aspect, the aspherical mirror is a concave aspherical mirror and the preselected diffractive pattern is disposed on a primary mirror surface of the aspherical mirror.

In accordance with another aspect, the preselected diffractive pattern is configured to generate diffractive spikes that can be measured. The measurements can be used to correct star field motion images collected by a telescope having an optical pathway along which the aspherical mirror is positioned.

In accordance with another aspect, the preselected diffractive pattern comprises an array of hexagons with each hexagon of the array being defined six holes located at six vertices of the respective hexagon. Each hole has a center and a circumferential edge that surrounds the respective center. At least the center of each hole is non-reflective to light of a wavelength of interest. The surface areas of the preselected diffractive pattern that surround the holes are reflective to the light of the wavelength of interest.

In accordance with another aspect, the holes have a diameter that is equal to between 20 and 30 micrometers (microns).

In accordance with another aspect, adjacent holes defining each respective hexagon are separated by a distance that is equal to between 110 and 150 microns.

In accordance with another aspect, a method is provided for forming a preselected diffractive pattern at a preselected location on a freeform optical surface. The method comprises: providing a freeform optical surface having a reflective layer; forming a layer of photoresist on top of the reflective layer; using a maskless photolithographic process to pattern the photoresist layer in X-, Y- and Z-directions of an X, Y, Z Cartesian coordinate system to form a photoresist mask that leaves preselected portions of the reflective layer unmasked and preselected portions of the reflective layer masked; etching the unmasked portions of the reflective layer to pattern the reflective layer into a diffractive structure having a preselected pattern; and removing the photoresist mask to uncover unetched portions of the reflective layer.

In accordance with another aspect, the maskless photolithographic process comprises: subjecting preselected areas of the photoresist layer to at least a first beam of laser light while varying an intensity level of the first beam of laser light over a range of preselected intensity levels; and producing relative motion between the first beam of laser light and the photoresist layer in X-, Y- and Z-directions of an X, Y, Z Cartesian coordinate system to expose the preselected areas of the photoresist layer to the preselected intensity levels in the X-, Y- and Z-directions.

In accordance with another aspect, the relative motion between the first beam of laser light and the photoresist layer in X-, Y- and Z-directions is produced by using a first stage to move the freeform optical surface in the Y-direction, using a second stage to move the freeform optical surface in the Z-direction, and using an optics system to move the first beam of laser light in the X-direction. The Z-direction is parallel to an optical axis of the first beam of laser light propagating between the optics system and the freeform optical surface. The X- and Y-directions are perpendicular to the Z-direction and to one another.

In accordance with another aspect, the intensity levels of the first beam of laser light are varied by using a modulator to modulate the first beam of laser light in accordance with a multi-bit number.

In accordance with another aspect, the multi-bit number is at least an eight-bit number such that the preselected areas of the photoresist layer are exposed to at least 256 intensity levels of the first beam of laser light.

In accordance with another aspect, the preselected diffractive pattern comprises an array of hexagons with each hexagon of the array being defined six holes located at six vertices, respectively, of the respective hexagon. Each of the holes have a center and a circumferential edge that surrounds the respective center. At least the center of each hole is non-reflective to light of a wavelength of interest. The surface areas of the preselected diffractive pattern that surround the holes are reflective to the light of the wavelength of interest.

In accordance with another aspect, the holes have a diameter that is equal to between 20 and 30 micrometers (microns).

In accordance with another aspect, adjacent holes defining each respective hexagon are separated by a distance that is equal to between 110 and 150 microns.

In accordance with another aspect, a method is provided for correcting star field motion images when performing astrometry. The method comprises: with an image detection system, acquiring star field motion images collected with a telescope, the telescope having an optics system that includes an aspherical mirror with a preselected diffractive pattern located off-axis relative to an optical axis of the aspherical mirror, the preselected diffractive pattern being on a primary mirror surface of the aspherical mirror, and wherein the preselected diffractive pattern generates diffractive spikes that are acquired by the image detection system along with the star field motion images; with a processing device, processing the acquired diffractive spikes to measure the diffractive spikes; and with the processing device, executing an image correction algorithm that corrects the acquired star field motion images based on the measured diffractive spikes.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

5                                    6

Figure 6:
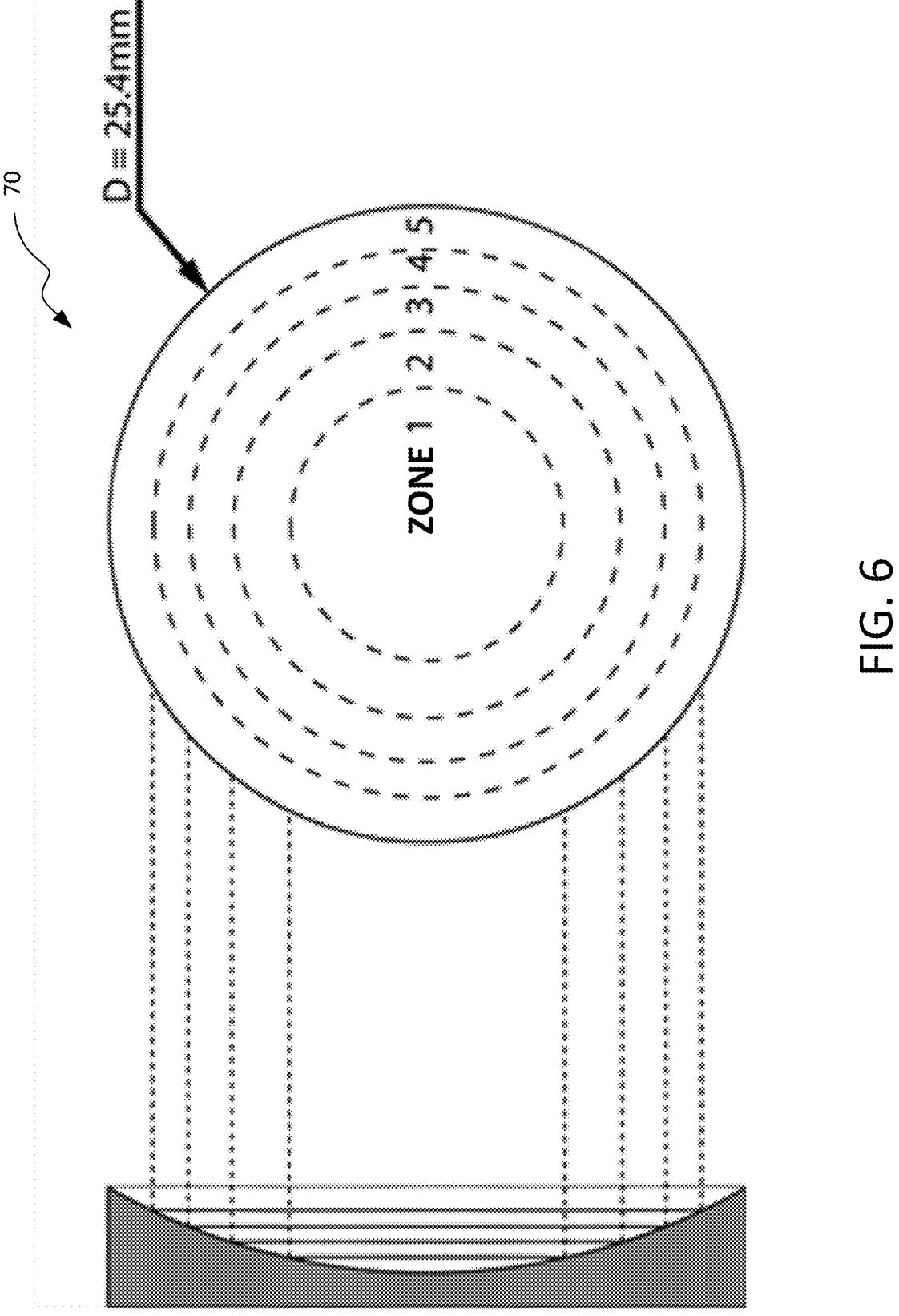

FIG. 6 shows side and top plan views of a first prototype DP, labelled DP A in Tables 1-3 below, which was fabricated by the MLT shown in FIGS. 4A and 4B.

Figure 4A:
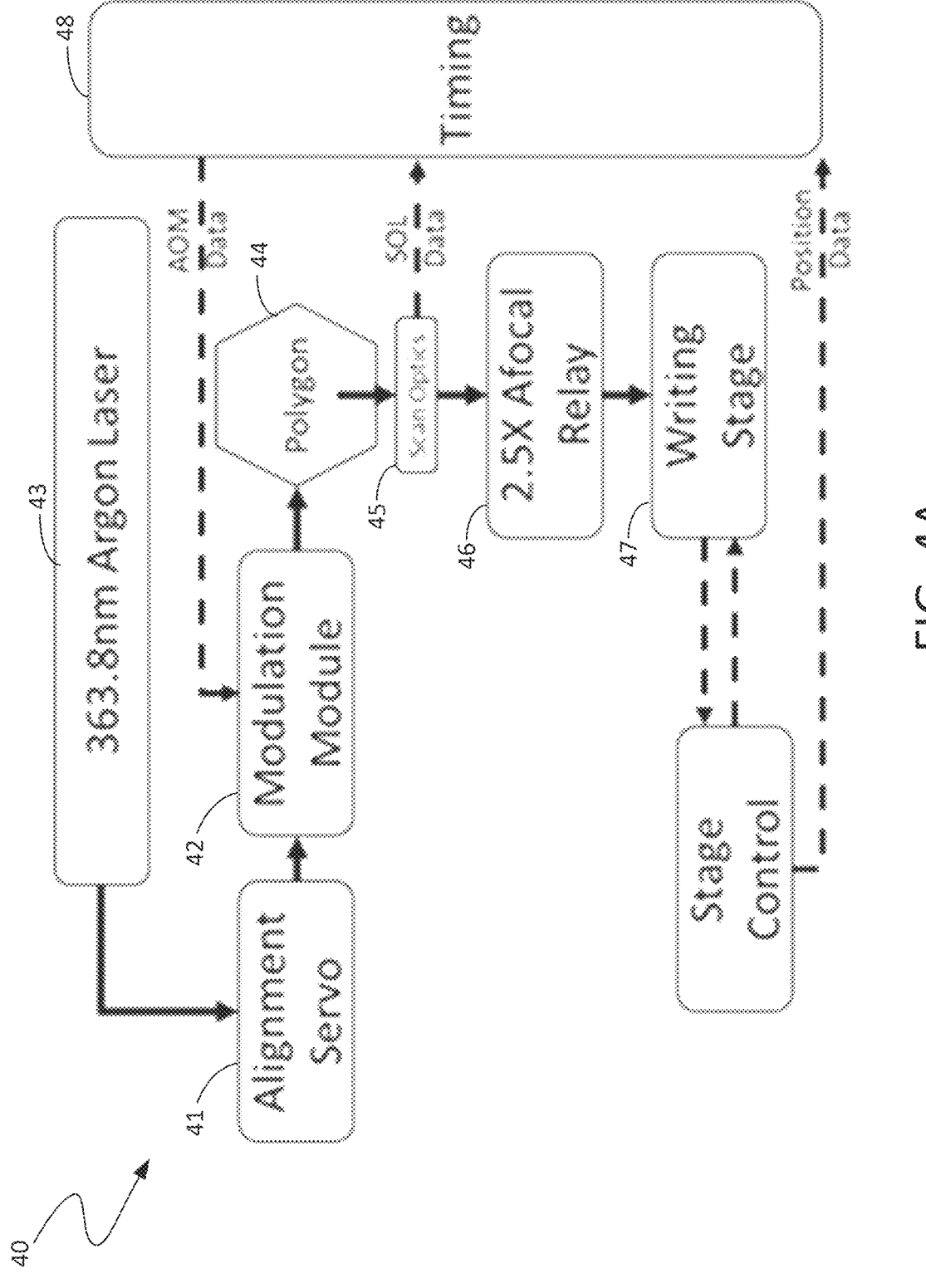
FIG. 4A is a block diagram of the maskless lithography tool (MLT) in accordance with a representative embodiment.
Figure 4B:
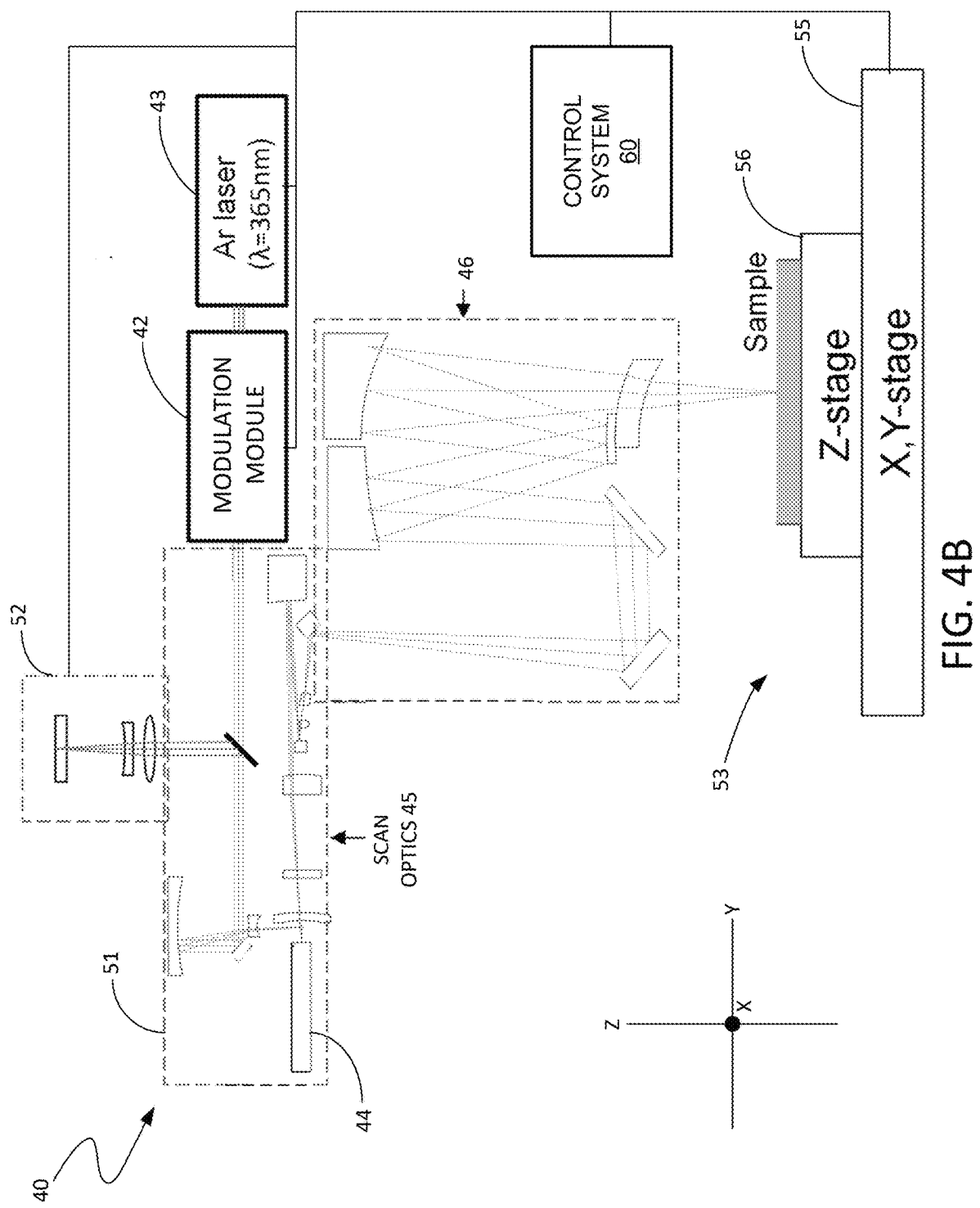
FIG. 4B is a side cross-sectional view of the optical configuration and path of the MLT shown in FIG. 4A in accordance with a representative embodiment.
Figure 7:
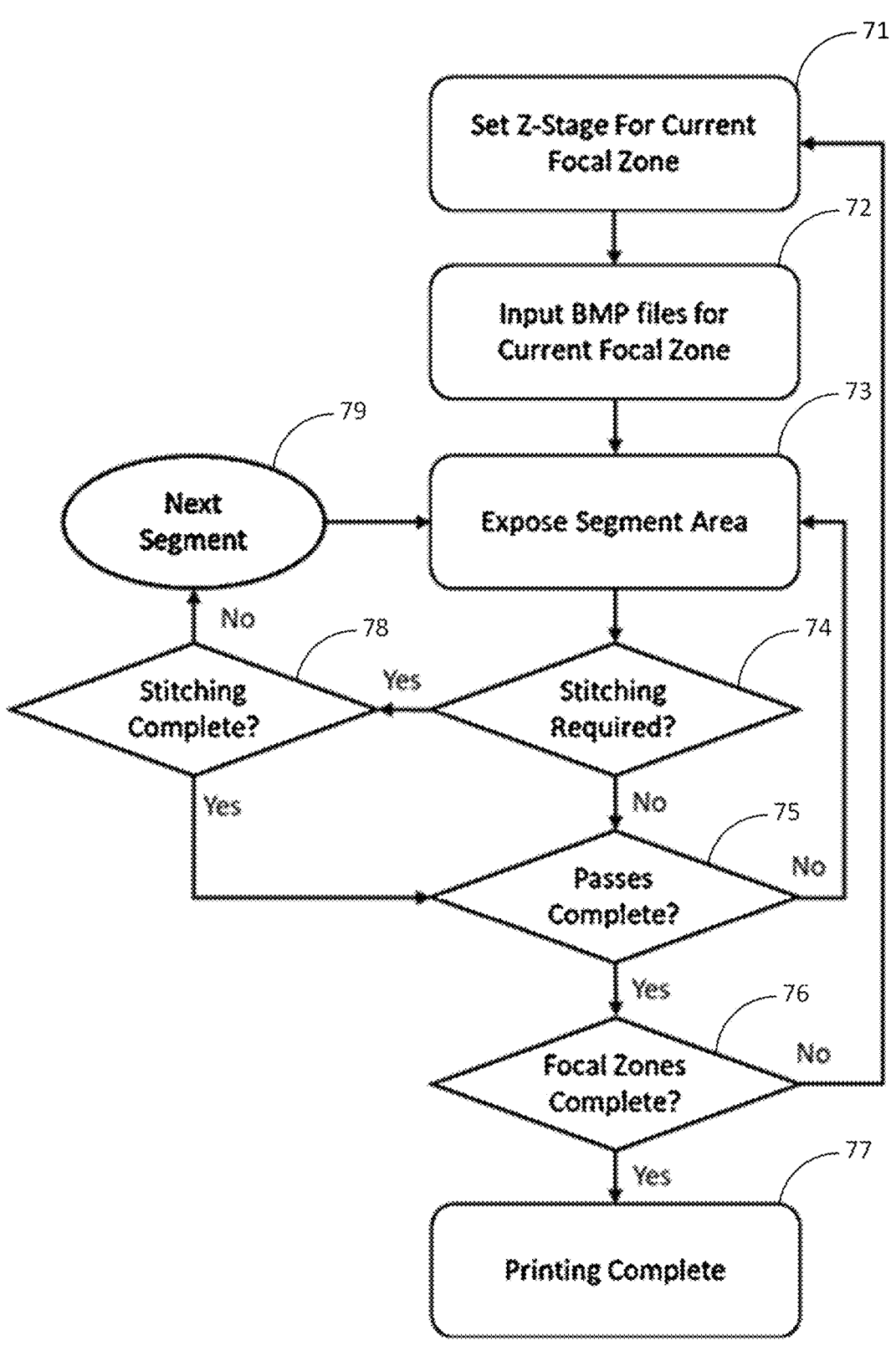

FIG. 7 is a flow diagram representing the non-planar exposure performed by the MLT shown in FIGS. 4A and 4B in accordance with a representative embodiment.

Figures 8A, 8B:
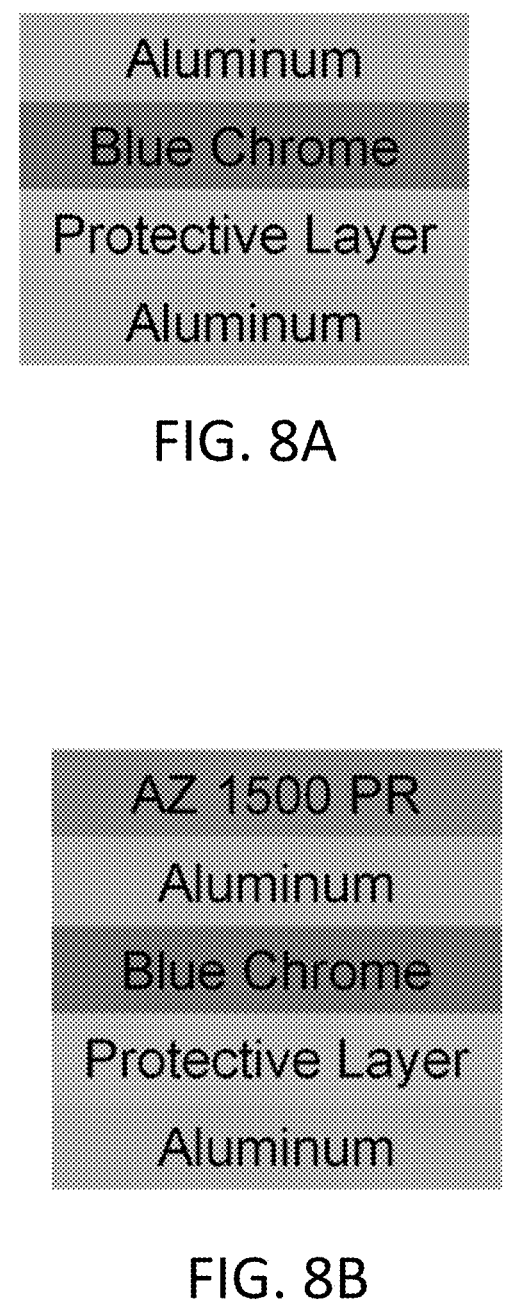

FIG. 8 shows a top plan view of a prototype of an optical element having a diffractive pupil (DP), which was fabricated by the MLT shown in FIGS. 4A and 4B.

Figure 9:
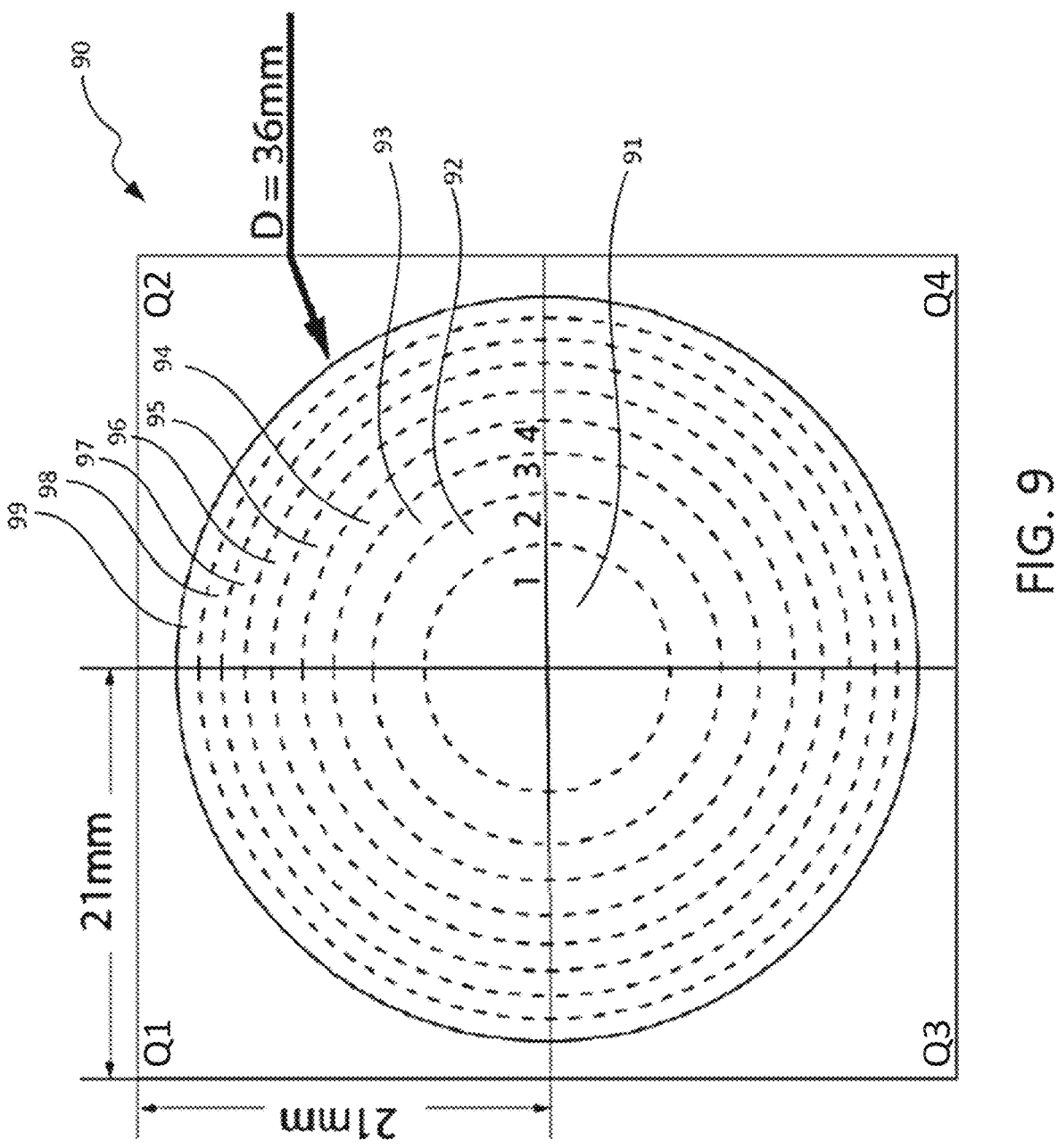

FIG. 9 shows a top plan view of a prototype of a DP that was fabricated by the MLT 40 shown in FIGS. 4A and 4B using the MLP described above with reference to FIGS. 4A and 4B.

Figure 10:
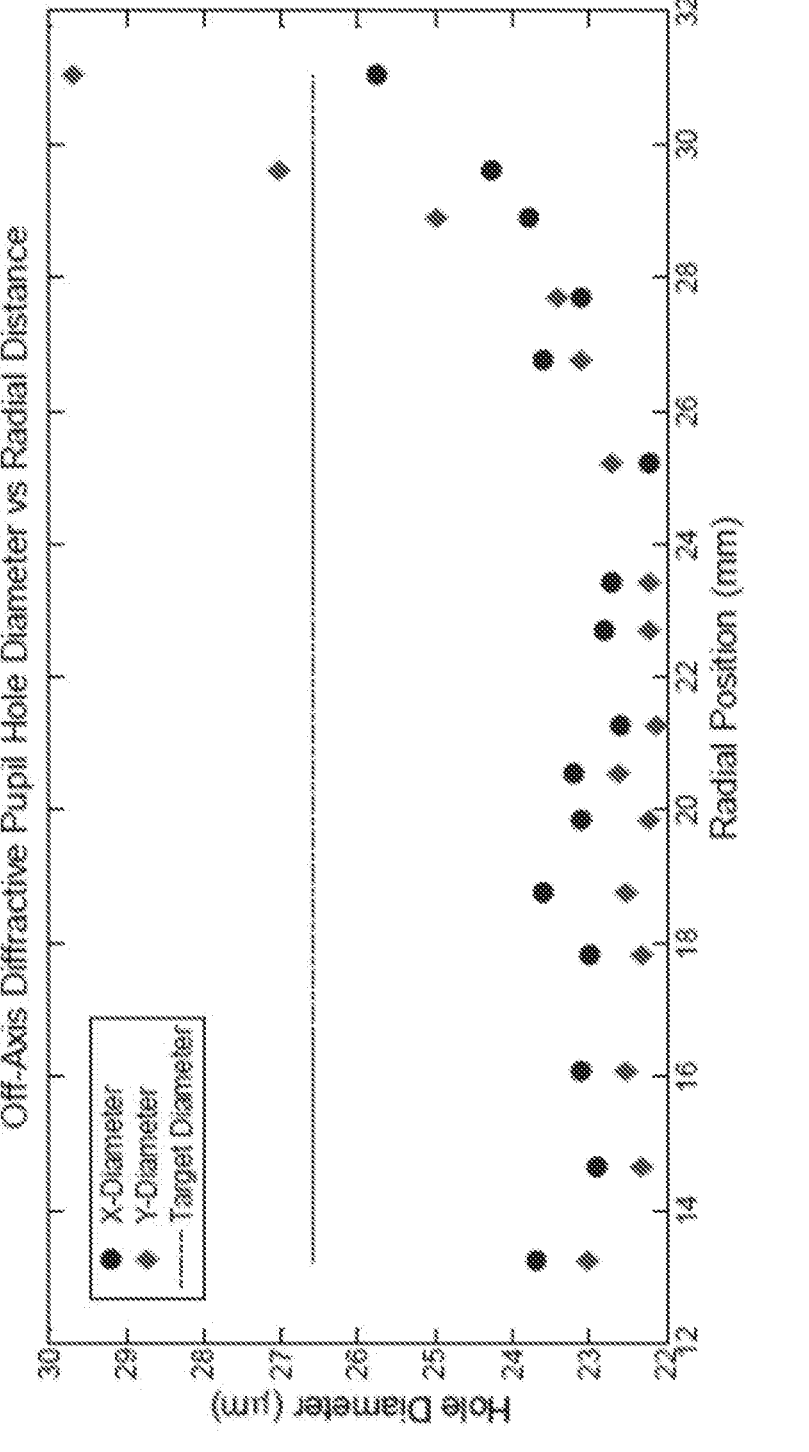

FIG. 10 is a plot of the X and Y hole diameters in microns as a function of radial distance in mm from the center of the substrate for the DP shown in FIG. 8.

Figure 11:
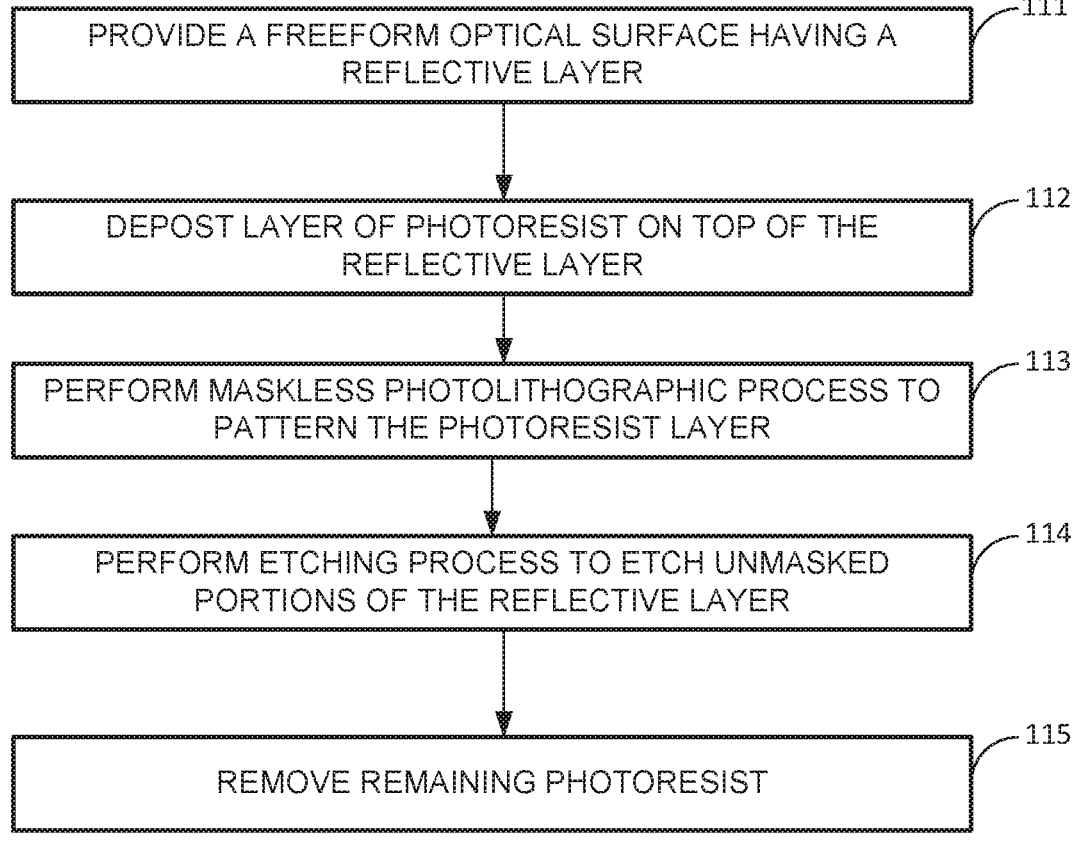

FIG. 11 is a flow diagram that represents the MLP for forming a preselected diffractive pattern of a DOE using MLP in accordance with a representative embodiment.

Figure 12A:
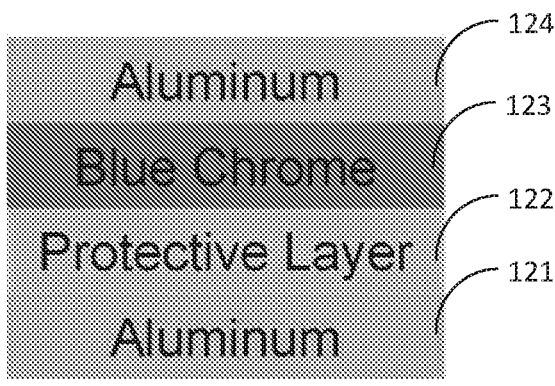
Figure 12B:
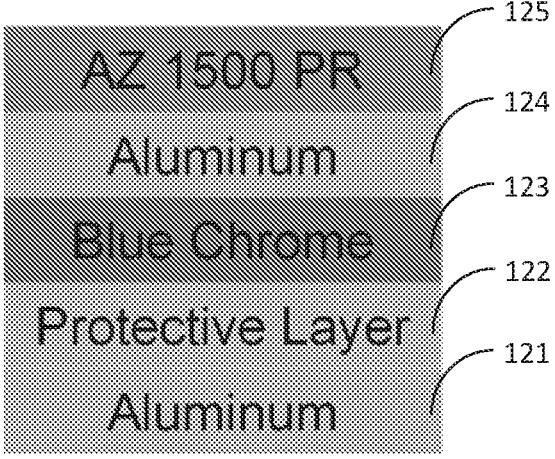

FIGS. 12A and 12B show a freeform optical surface before and after, respectively, a layer of photoresist has been formed on the freeform optical surface by the process represented by the flow diagram shown in FIG. 11 in accordance with an embodiment.

Figure 13:
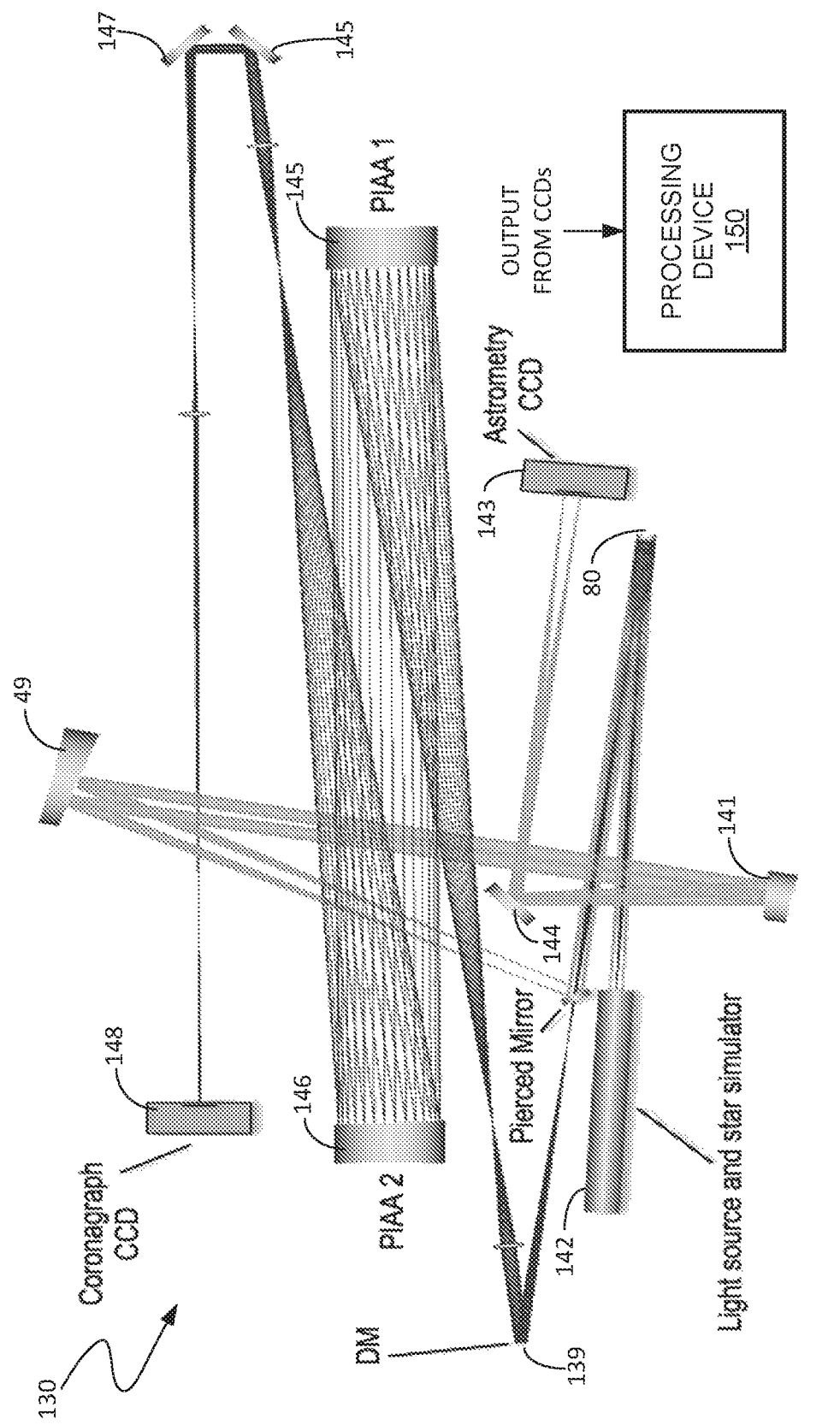

FIG. 13 shows a schematic diagram of an example of an astrometry system that incorporates an optical device of the type shown in FIG. 1, 6, 8 or 9 in accordance with a representative embodiment.

DETAILED DESCRIPTION

The present disclosure is directed to an optical device comprising a freeform substrate having at least one DOE formed thereon and a maskless lithographic process performed by a maskless lithographic tool (MLT) to form DOEs on freeform substrates with very high precision. A few representative embodiments of the optical device and of the system and method for making the optical device will now be described with reference to the figures, in which like reference numerals represent like components, elements or features. It should be noted that features, elements or components in the figures are not intended to be drawn to scale, emphasis being placed instead on demonstrating inventive principles and concepts.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context. The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing device," as those terms are used herein encompass an electronic component that is able to execute a computer program or executable computer instructions. References herein to a system comprising "a processor" or "a processing device" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

Figure 1:
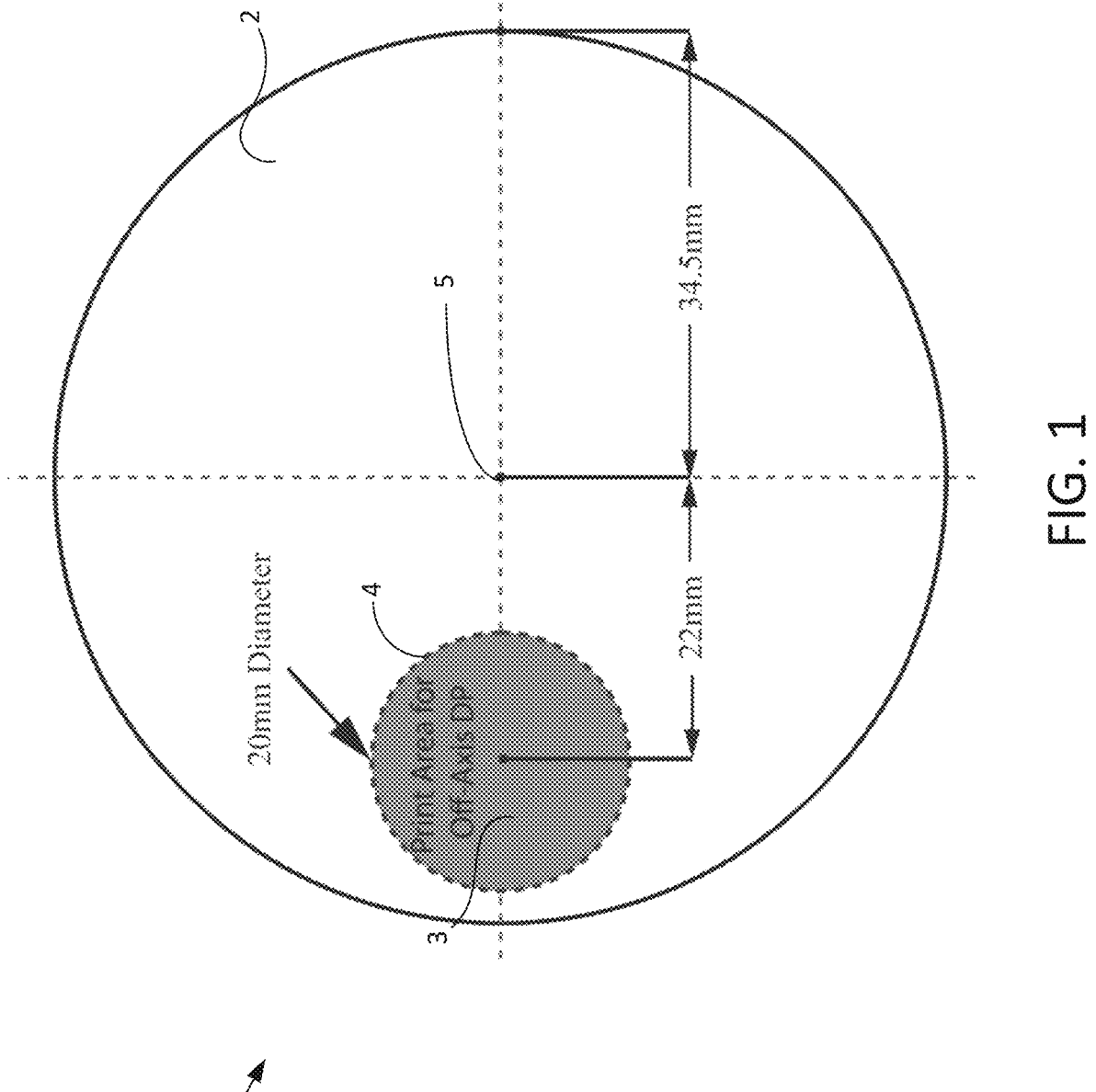
FIG. 1 is a front plan view of an optical device comprising a freeform optical surface having a DOE disposed on the freeform optical surface at an off-axis position.

FIG. 1 is a front plan view of an optical device 1 comprising a freeform optical surface 2 having a DOE 3 disposed on the freeform optical surface 2. In accordance with this representative embodiment, the freeform optical surface 2 comprises a reflective surface, which may be achieved by coating the surface 2 with a reflective metallic coating, such as an aluminum coating, for example. The DOE 3 comprises a diffractive pattern that is preselected to achieve a desired optical effect. The preselected diffractive pattern of the DOE 3 can be any suitable diffractive pattern capable of achieving a desired optical effect or function. Likewise, the freeform optical surface 2 can be any suitable freeform optical surface capable of achieving a desired optical effect or function. The freeform optical surface 2 is a three-dimensional (3-D), non-spherical, non-planar surface. The term "freeform optical surface," as that term is used herein, denotes a surface having no translational or rotational symmetry.

In accordance with a representative embodiment, the freeform optical surface 2 is an aspherical, convex mirror and the preselected location 4 at which the DOE 3 is disposed is off-axis relative to an optical axis 5 of the aspherical mirror 2. The preselected diffractive pattern of the DOE 3 is disposed on a primary mirror surface of the aspherical mirror 2. In accordance with a representative embodiment, the preselected diffractive pattern of the DOE 3 is configured to generate diffractive spikes that can be measured. As will be described below in more detail, the measurements can be used to correct star field motion images collected by a telescope having an optical pathway along which the aspherical mirror 2 is positioned.

One emerging application of DOEs that calls for non-planar diffractive optics exists in the field of astrometric exoplanet detection and characterization. The implementation of a curved DOE at the pupil plane, herein termed a Diffractive Pupil (DP), allows for post-exposure correction of the asymmetric distortion characteristic of long exposures in coronagraphs of star fields surrounding exoplanet star systems. The present disclosure includes a demonstrated fabrication of a set DPs on a variety of non-planar surfaces and the resulting patterns are characterized and tested.

The concept of a DP was first proposed by Guyon et al. in 2012 in an article entitled "High-precision astrometry with a diffractive pupil telescope." published in The Astrophysical Journal Supplement Series 200.2 (2012): 11, as a tool for correcting asymmetric distortion induced by long exposures during astrometric characterizations of exoplanets using the motion of the surrounding star field. In 2013, Bendek, Eduardo, et al. published an article on the subject entitled "Compatibility of a diffractive pupil and coronagraphic imaging," in Publications of the Astronomical Society of the Pacific 125.924 (2013): 204. The DP is placed in a dual high-contrast coronagraph imaging system, and the diffractive pattern produces chromatic spikes in the image plane. These spikes are deviated by asymmetric distortion in the system, the effect of which may be reversed through post processing correction to calibrate the motion of the star field to sub-microarcsecond accuracy. This correction allows the full system to effectively perform coronagraphic imaging and mass measurement of exoplanets surrounding a central star.

The desire to place optical elements with optical power at pupil conjugates drives the need for fabrication of an arbitrary DOE pattern on a curved surface. The folding nature of the astrometric optical system described by Guyon et al. also encourages the DP to be on an off-axis conic section. In accordance with a representative embodiment, the optical element 1 shown in FIG. 1 is designed for such purposes and is fabricated by the system and method described herein with sufficiently high precision to achieve sub-microarcsecond accuracy. In accordance with a representative embodiment, the DOE 3 is a reflective binary amplitude DOE comprising a hexagonal tessellation of circular holes with diameters dependent on the contrast between the holes and a reflective layer, as will be described below in more detail with reference to FIGS. 2A-2C. The size and relative reflectivity of the holes compared to the primary reflective (e.g., aluminum) layer determine the diffraction efficiency of the diffraction spikes in the image plane and, therefore, the contrast between the spikes and the image they are used to correct. In accordance with this embodiment, the hole diameter is scaled inversely by the squared ratio of reflectivity of the holes to the primary reflective (e.g., aluminum) layer to achieve the proper spike contrast in the image.

Several prototypes of such DPs have been fabricated by the inventors and are described below in more detail with reference to Tables 1-3 and FIGS. 4A and 4B. As will be described below in more detail, a maskless lithographic process (MLP) performed by a maskless lithographic tool (MLT) preferably is used to fabricate the optical device 1.

Figures 2A, 2B, 2C:
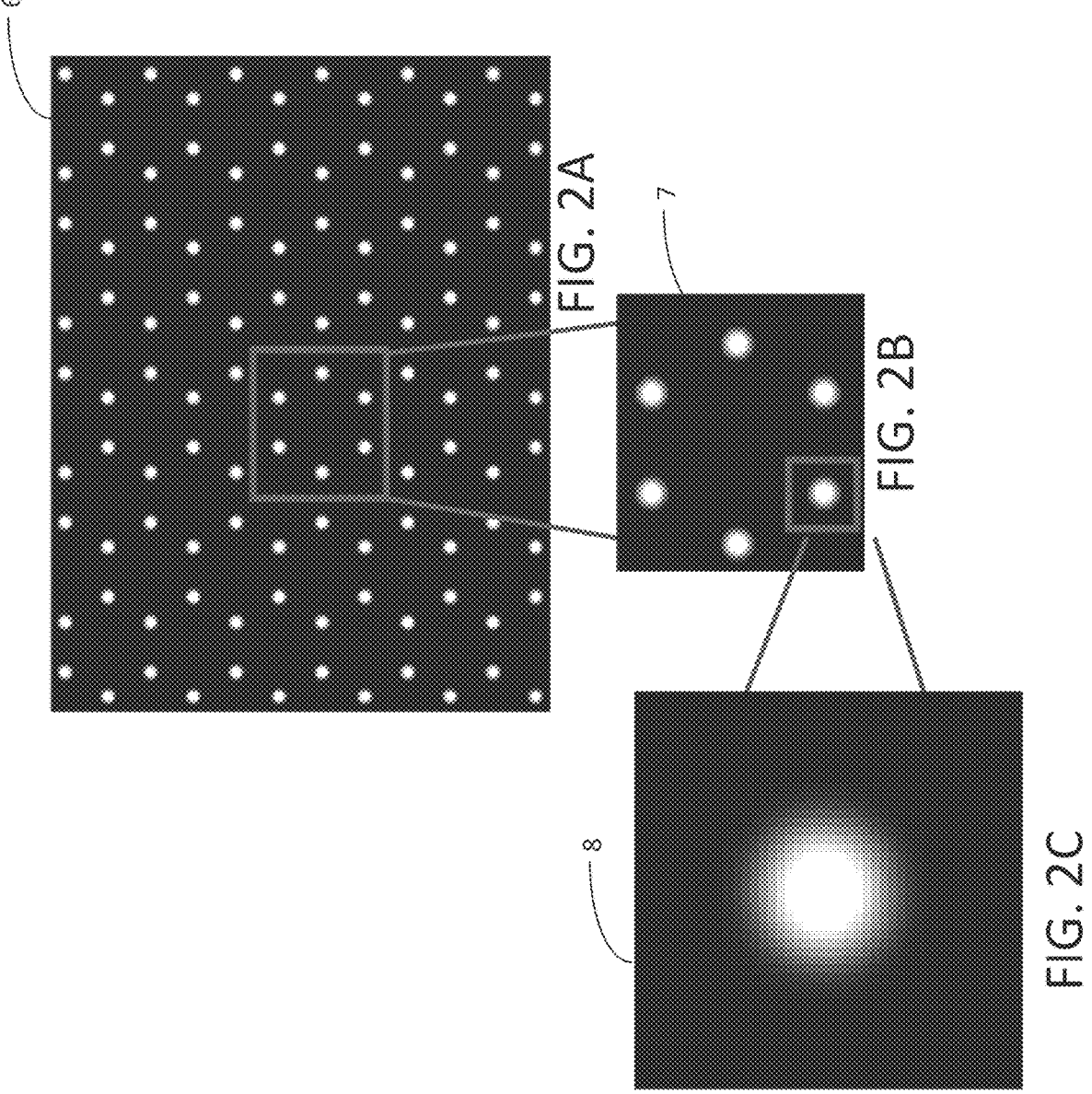
FIG. 2A shows a front plan view of an exposure map formed in a photoresist layer that is subsequently used during a maskless lithography process by a maskless lithography tool to fabricate the optical device shown in FIG. 1 having the DOE thereon in accordance with a representative embodiment.
FIG. 2B shows an enlarged front plan view of a portion of the exposure map shown in FIG. 2A corresponding to a base unit of the exposure map.
FIG. 2C shows an enlarged front plan view of a portion of the portion of the exposure map shown in FIG. 2B.

FIG. 2A shows a front plan view of an exposure map 6 formed in a photoresist layer that is subsequently used during the MLP by the MLT to fabricate the optical device 1 having the DOE 3 thereon in accordance with a representative embodiment. FIG. 2B shows an enlarged front plan view of a portion 7 of the exposure map 6 shown in FIG. 2A. The portion 7 is a base unit of the exposure map 6. The base unit is a FIG. 2C shows an enlarged front plan view of a portion 8 of the portion 7 of the exposure map 6 shown in FIG. 2B. In accordance with a representative embodiment, the exposure map is a supergaussian grayscale pattern. The hexagonal array of circular holes that make up the DP with a side length of a and a hole diameter of D. For this representative embodiment, each hole was constructed using 2.1 μm square pixels, but application of the grayscale supergaussian scaling to the exposure values improves the ability to create uniform circles. For the prototypes described below with reference to Tables 1-3, the hole diameters ranged from 10.5 to 26.5 microns and the hexagonal side lengths ranged from 42 to 120 microns, although the hole diameters and side lengths are not limited to these ranges, as will be understood by one of skill in the art in view of the description being provided herein.

Thus, in accordance with this representative embodiment, the preselected diffractive pattern of the DOE 3 that is obtained using the exposure map 6 comprises an array of hexagons (FIG. 2B), with each hexagon of the array being defined by six holes (FIG. 2C) located at six vertices of the respective hexagon. Each hole has a center and a circumferential edge that surrounds the respective center. At least the center of each hole is non-reflective to light of a wavelength of interest or wavelength range of interest. The holes are areas of the freeform optical surface 2 where of the reflective material has been removed. Surface areas of the preselected diffractive pattern that surround the holes are reflective to the light of the wavelength of wavelength range of interest. A representative embodiment of the MLT and MLP for fabricating the optical device 1 using the exposure map 6 is described below in more detail with reference to FIGS. 4A-6.

Creating uniform circular holes with square pixels is challenging, especially when printing holes with diameters of only a few pixels. With the configuration of the MLT 40 shown in FIGS. 4A and 4B having a 2.1 μm pixel size, the smallest specified circular holes are defined in as few as 5 pixels across the diameter. The edges are partially smoothed because the focused spot of the MLT is a circular beam slightly larger than the pixel size. As mentioned above, in accordance with a representative embodiment, the shape of the circular holes is improved by making the pattern grayscale and applying supergaussian top hat scaling to each hole.

Figure 3:
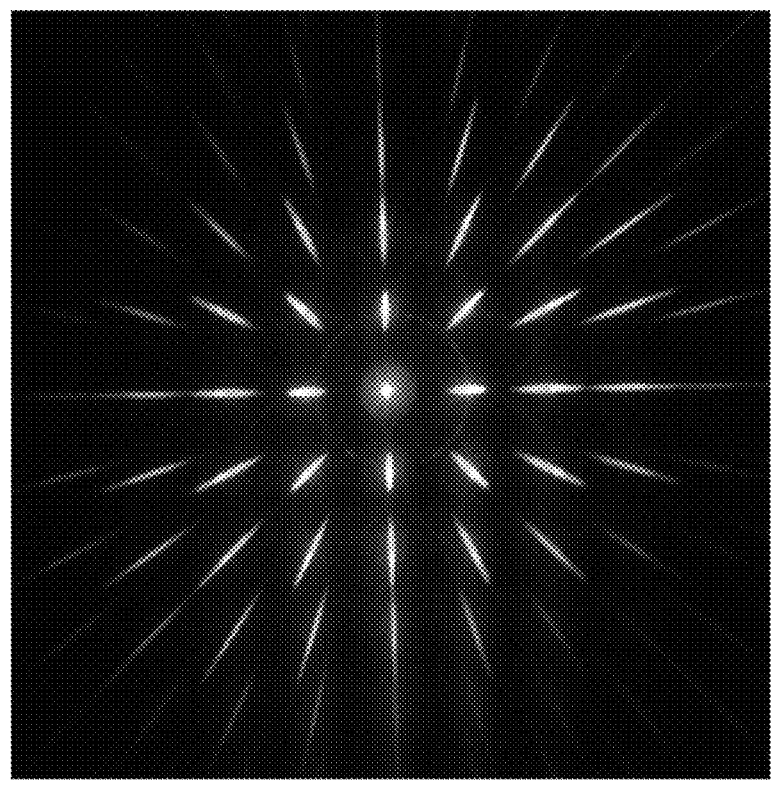
FIG. 3 shows an image formed by the preselected diffractive pattern in accordance with a representative embodiment.

FIG. 3 shows an image formed by the preselected diffractive pattern of the DOE 3 shown in FIGS. 2A-2C. When light of a wavelength or wavelength range of interest is incident on the preselected diffractive pattern of the DOE 3, an array of diffractive spikes are formed, as depicted in FIG. 3. If the light contains asymmetric distortion, which is typically the case when performing astrometry to detect exoplanets, the diffractive spikes will deviate from the shapes that they have under ideal conditions in the absence of asymmetric distortion. The extent to which the diffractive spikes deviate can be measured and those measurements can then be used to correct the star field motion images to remove the distortion, as will be described below in more detail with reference to FIG. 9.

FIG. 4A is a block diagram of the MLT 40 in accordance with a representative embodiment. FIG. 4B is a side cross-sectional view of the optical configuration and path of the MLT 40 shown in FIG. 4A in accordance with a representative embodiment. The MLT 40 comprises several key subsystems, including an alignment servo 41 for beam alignment, a modulation module 42 to control the power of a laser 43 of the MLT 40, a rotating polygon mirror 44 for producing a scanline, scan optics 45, an afocal relay 46 to focus the scanline onto a writing stage 47, timing logic 48 that controls the modulation module 42, and a stage controller 49 for controlling the writing stage 47 and sending position data to the timing logic 48.

The laser 43, which may be, for example, a continuous wave Coherent Sabre argon-ion laser configured for 363.8 nm emission at power levels up to 1.3 W, provides the exposure beam. With reference to FIG. 4B, in accordance with this representative embodiment, the beam is directed onto an optical tabletop 51 and passes through a beam stabilizer comprising a closed loop servo with two piezo-actuated mirrors and two quad-cell detectors that apply analog signal algebra to align the output beam on a spatial filter. Laser power is modulated at high frequency via an acousto-optic (AO) modulator of the modulation module 42 and is then converted into an x-direction scan line by the rotating polygon mirror 44, which may be, for example, a 12-sided polygon mirror rotating at 3000 revolutions per minute (rpm) on an air bearing spindle. In accordance with this representative embodiment, the scanline is flattened and corrected by the scan optics 45 and then reduced 2.5× by the afocal relay 46 before coming to focus at the horizontally-oriented sample stage 56 with a preselected minimum spot size of approximately 2.1 μm and a scan length of greater than 25 mm with 12,000 effective pixels per scan line. The writing stage 47 shown in FIG. 4A comprises the sample stage 56 shown in FIG. 4B, which is depicted as the Z-stage in FIG. 4B.

In accordance with a representative embodiment, the sample stage 56 sits on a pair of Aerotech linear X and Y stages 55 for X-Y translation, as well as coupled tip, tilt and rotation adjustments. The pair of X and Y linear stages 55 are depicted in FIG. 4B as the X, Y-stage. A large range of motion on the X and Y linear stages 55 allows stitching exposure fields over large areas. The Z-stage 56 is motorized to allow for zonal focal adjustments necessary to print on non-planar surfaces, which are accomplished by allocating a depth of focus (DOF) based on in-focus zones of the desired pattern and breaking the exposure into multiple focus steps. A vacuum line (not shown) connected to a platen of the sample stage 56 secures the substrate being exposed. Stage motion, polygon position, and beam modulation are synchronized by the stage controller 49 operating in conjunction with the timing logic 48. The stage controller 49 in combination with the timing logic 48 perform the synchronization based on detection of a start-of-line (SOL) signal and implementation of a digital delay between lines of exposure data.

In accordance with a representative embodiment, exposure data are input as grayscale bitmap patterns with 8-bit pixel depth and maximum size of 12k×12k pixels, which corresponds to a pattern size of 25.2×25.2 mm. Custom LabVIEW software interfaces positioning devices and the timing electronics with user inputs, such as the exposure map, start coordinates, and the desired number of exposures. In basic operation, the exposure data are processed in the timing logic 48 and acousto-optic modulator (AOM) data are transmitted to the modulation module 42. Timing of the AOM data is controlled by the position data sent from the stage controller 49 and the SOL signal. The AOM data does not begin before the writing stage 47 is in the correct start position, as indicated by the stage controller 49, and the start of each line of data is triggered by the SOL signal. In accordance with this representative embodiment, the software contains a variety of additional capabilities, such as applying linear correction for smooth grayscale exposure, stitching, and sequencing to print on larger areas or print overlaid patterns, and an alignment algorithm with fiducial mark recognition.

Figure 5:
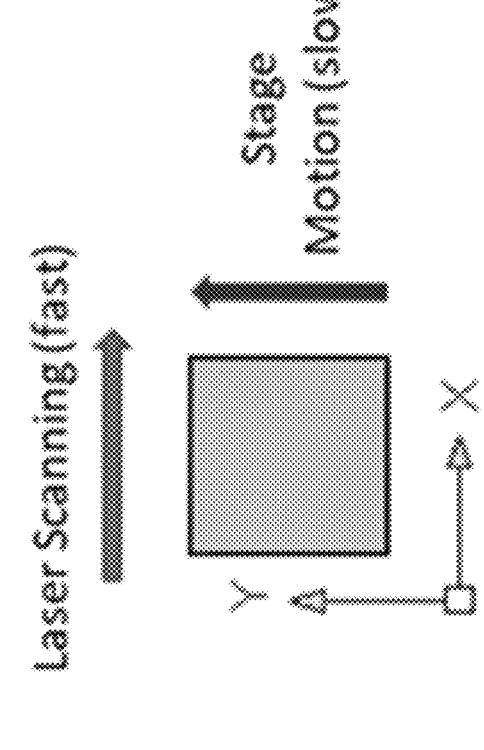
FIG. 5 is a pictorial illustration of the manner in which DOF measurements are made to ensure precision DOF printing by the MLT shown in FIGS. 4A and 4B.
Figure 5:
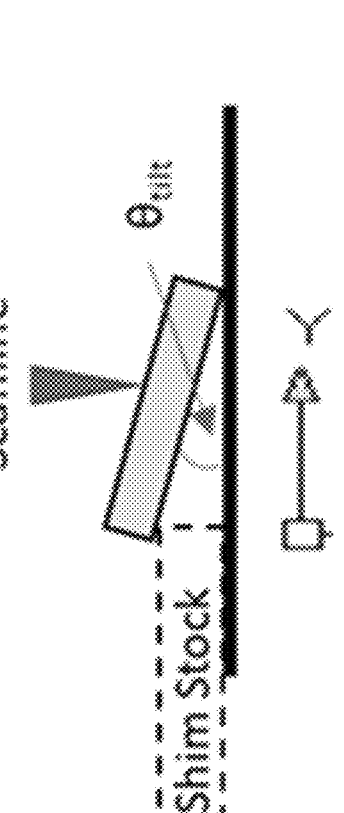

FIG. 5 is a pictorial illustration of the manner in which DOF measurements are made to ensure precision DOF printing. The DOF of the MLT 40 is dependent on the size and shape of the most sensitive components of the pattern being printed. Therefore, preferably the DOF is measured and allocated for each unique pattern type. The DOF is measured by printing a calibration pattern containing representative elements of the desired final pattern on a planar substrate tilted at a known angle, $\theta_{tilt}$, as shown in FIG. 5. The resulting pattern is evaluated by measuring critical pattern dimensions along the tilted direction and determining the spatial boundaries at which the pattern is out of specification. These boundaries are then converted to a focal range using the tilt angle. Smaller or more complex features generally restrict the DOF to a smaller range.

The control system 60 comprises a computer that has one or more processors configured to perform one or more algorithms that control the modulation module 42 and the sample stage 53 in accordance with a virtual mask, i.e., the exposure map, stored in a computer-readable medium (e.g., a solid state memory device) of the control system 60. The MLT 40 is referred to as "maskless" in that a virtual mask instead of an actual physical mask is used to pattern the photoresist layer disposed on the sample. This process is also referred to herein as a direct-write laser lithographic process or a 3-D printing process. The patterned photoresist layer is subsequently used as a mask during an etching process that etches into the reflective metallic layer disposed beneath the patterned photoresist layer to pattern the reflective metallic layer into the preselected diffractive pattern of the DOE 3.

The control system 60 accomplishes the 3-D printing process by controlling the motorized sample stage 53 and the modulation module 42 based on the virtual mask, which, in accordance with a representative embodiment, is an eight-bit bitmap pattern. This allows the preselected diffractive pattern to be formed as an eight-bit grayscale structure. Because the profile of the freeform optical surface 2 and the preselected diffractive pattern are known in advance by the control system 60, the control system 60 is able to control the motorized sample stage 53 and the modulation module 42 to achieve the desired exposure contours in the photoresist layer of the sample. During the process, the control device 60 controls the motion of the sample while presenting a preselected sequence of eight-bit bitmaps to the modulation module 42, which modulates the laser light beam produced by the laser 43 to produce laser light beam intensity levels having eight-bit grayscale resolution. This allows the preselected diffractive pattern to be formed with very high precision.

FIG. 6 shows side and top plan views of a first prototype DP 70, labelled DP A in Tables 1-3 below, which was fabricated by the MLT 40 shown in FIGS. 4A and 4B using the MLP described above with reference to FIGS. 4A and 4B.

TABLE 1

The substrate and pattern specifications for DPs A-C.

| Diffractive Pupil (DP) | Substrate Type | Hex Side Length (a) | Hole Diameter (D) |
|---|---|---|---|
| A | 25 mm Concave Spherical | 42 μm | 10.5 μm |
| B | 69 mm Convex Aspheric | 120 μm | 26.6 μm |
| C | 38 mm Concave Spherical | 42 μm | 10.5 μm |

TABLE 2

The lithography parameters used for the exposure of DPs A-C. DP-B required an additional low reflectivity R632 Blue Chrome layer for improved contrast.

| Diffractive Pupil (DP) | Resist Type | Metal Coatings | Pre/Post Exposure Bakes | Laser Power | Passes per Focal Zone |
|---|---|---|---|---|---|
| A | S1805 | 100 nm Aluminum | 60 sec @115° C./ None | 400 mW | 6 |
| B | AZ1500 | Telic R632 Blue Chrome 100 nm Aluminum | None/ None | 300 mW | 6 |
| C | AZ3312 | 100 nm Aluminum | 180 sec @115° C./ 270 sec @115° C. | 300 mW | 24 |

TABLE 3

Measured hole diameters for DPs A-C compared to the specifications requested by the sponsor. The tolerance set around the design hole diameter is ±10%.

| Diffractive Pupil (DP) | Hole Diameter | | |
|---|---|---|---|
| | Design | Measurement | Error |
| A | 10.5 μm | 10.4 ± 0.4 μm | −0.90% |
| B | 26.6 μm | 23.3 ± 1.5 μm | −11.98% |
| C | 10.5 μm | 11.0 ± 1.0 μm | 4.76% |

DP A 70 was fabricated on a 25.4 mm diameter concave spherical mirror (not shown in FIG. 6) having a 500 mm radius of curvature. Electron (E)-beam evaporation was used to apply a 100 nm aluminum layer, as shown in Table 2. Shipley S1805 positive tone photoresist was then applied by spin coating at 3000 rpm for 30 seconds followed by a soft bake at 115 C for 60 seconds. The exposure region was broken into five equal depth focal zones, labeled zones 1-5 in FIG. 6, each covering a single full DOF of the MLT (30 μm in the representative embodiment), as shown in FIG. 6. The spatial extent of each focal zone was determined by contouring the surface of the substrate with boundaries set where the sag of the surface equals an integer multiple of the allocated DOF. For a spherical surface, contours are concentric spherical rings with thickness decreasing away from the center. Focal zones each have an associated z-position and a corresponding ring bitmap pattern representing the area on the surface that is in focus for that z-position. Focus is adjusted for each consecutive exposure. A reference position for the Z-stage 56 on the MLT is determined based on the calculated center thickness of the concave substrate such that the vertex of the substrate is in focus at the reference z position. The Z-stage 56 is shifted relative to this position to select the current focal zone.

FIG. 7 is a flow diagram representing the non-planar exposure performed by the MLT in accordance with a representative embodiment to fabricate DB A 70. In accordance with this embodiment, the focal zones are completed one at a time and are stitched in segments if the desired area is larger than 25×25 mm. The position of the Z-stage 53 is adjusted by the allocated DOF between each focal zone. For DP A 70, this process comprises setting the z-position for the current focal zone (block 71), importing the bitmap file for that zone (block 72), and exposing the segment area for a set number of passes. Stitching is not required for DP A 70 because the overall size of the pattern is less than 25×25 mm, and therefore the process continues through blocks 74 and 75 to block 76. At block 76, a determination is made as to whether all focal zones have been completed. If not, the process returns to block 71 and the Z-stage 53 is set for the next zone. Thus, after each focal zone is completed, the Z-stage 53 is set for the next zone and the next pattern is input. This process is repeated until all zones are completed (block 77).

In accordance with the representative embodiment of the MLT 40 shown in FIGS. 4A and 4B, each focal zone exposure (block 73) comprised six passes at 400 mW laser power for DB A 70. The substrate was then immersion developed in AZ300 MIF for 60 seconds with slight agitation applied every 15 seconds followed by a rinse in DI water and N2 drying. The pattern was then transferred into the aluminum layer through wet etching with phosphoric acid solution for 2.5 minutes at room temperature. Finally, the photoresist was stripped with acetone, rinsed with isopropyl alcohol, and dried with nitrogen. Coating parameters, resist type, bake times, and development chemicals are shown in Table 2.

FIG. 8 shows a top plan view of a prototype of an optical element 80 having a DP 81 labelled DP B in Tables 1-3 above, which was fabricated by the MLT 40 shown in FIGS. 4A and 4B using the MLP described above with reference to FIGS. 4A and 4B. DP-B 81 is an off-axis DP fabricated on a section of an aspheric convex secondary mirror 82 extracted from a commercial Cassegrain telescope. This substrate has a primary radius of curvature of −723 mm with an aspheric constant of −7.166 and a diameter of 69 mm, as shown in Table 1. The substrate, as-provided, has an aluminum layer coating under a protective dielectric layer coating. Since the dielectric protective layer prevents a wet etching process from transferring the desired hole pattern to the underlying aluminum layer, an additional coating sequence is used. The solution used in this work is to first coat a proprietary low reflectivity R632 Blue Chrome layer provided by Telic Inc, which exhibits broadband reflectivity of less than 10% for wavelengths between 500 and 750 nm. A second layer of 100 nm aluminum and a layer of AZ1500 resist are also applied by Telic over the R632. The pattern is etched into the top aluminum layer and the R632 Blue Chrome layer prevents light from passing through the holes and reflecting from the underlying protected aluminum layer. The low reflectivity of the R632 Blue Chrome layer provides the necessary contrast with respect to the top aluminum layer. Flat test plates with the same coating structure were used to calibrate laser exposure levels.

The exposure pattern for DP-B 81 is divided into a series of nine focal zones 83-91 that are arc segments because the pattern is located off axis, as shown in FIG. 8. The off-axis section is a 20 mm diameter circular area located 22 mm off-center. The substrate is mechanically aligned to the sample stage 53 (FIG. 4B) and initial focus is tested on the center of substrate using a retroreflection conjugate camera in the sensing optics 52 on the MLT 40. Each zone is exposed with six passes at 300 mW laser power, as described above with reference to FIG. 7. Referring again to FIG. 7, the process for exposing DP B 81 follows the same path as that of DP A 70 in the flow diagram (blocks 71-76 until completed, and then to block 77), but the z-positions are tailored to the concave aspheric substrate and the bitmap files now contain the arc segments associated with each of the focal zones 83-91. Stitching (blocks 73, 74, 78 and 79) is not required as the patterned area does not exceed 25×25 mm. The same development and aluminum etching steps described above with reference to DP A 70 are used to develop and etch DP B 81, as shown in Table 2.

FIG. 9 shows a top plan view of a prototype of a DP 90 labelled DP C in Tables 1-3 above, which was fabricated by the MLT 40 shown in FIGS. 4A and 4B using the MLP described above with reference to FIGS. 4A and 4B. DP C 90 is on the full front face of a 36 mm diameter concave spherical substrate (not shown in FIG. 9) having a 500 mm radius of curvature. Since the MLT single-exposure printing area is limited to 25×25 mm, the large print area of DP C 90 is stitched for each focus zone. Stitching alignment was conducted prior to fabrication using test plates and a Veeco NT9800 profilometer to measure stitching error, which was initially on the order of 1-5 μm in both the X and Y dimensions. This error was evaluated by printing a ruled calibration pattern on the test plates and using the profilometer to measure the misalignment of vertical and horizontal rulings. Several iterations were performed to converge the stitching error to less than 1 μm. The surface of DP C was aluminized the same as DP A 70, i.e., with a simple 100 nm aluminum layer on top of the glass substrate. A layer of AZ3312 resist was applied at 3000 rpm for 30 seconds and soft-baked for 3 minutes at 115° C., as shown in Table 2.

The exposure pattern for DP C 90 is divided into nine focal zones, 91-99, and four stitched 21 mm×21 mm seg-ments, as shown in FIG. 9. With respect to the flow diagram of FIG. 7, DP C followed a similar path to that of DP A 70 and DP C 81, with the exception that the stitching loop (blocks 73, 74, 78 and 79) was performed in this case. For each of the focal zones 91-99, four stitched quarter-arcs were printed to cover the full pattern area. The total print time for DP C 90 of eight hours was an increase by more than a factor of five compared to the print time for DP A 70. Each of the 36 unique exposure regions required 24 over-lapped exposure passes at 300 mW laser power. A post-exposure bake for 4.5 minutes at 115° C. was performed, followed by the same development, etching and stripping processes used for the 25.4 mm diameter substrates of DB A 70 and DB B 81.

Results

The primary fabrication targets are hole diameter, ellip-ticity, and spatial separation, as shown in Table 3. The primary metrology tool used for evaluating DP patterns is a Veeco NT9800 white-light interferometer with 5×, 20×, and 50× objectives allowing for measurement precision of up to 100 nm. For the measurements, the Z-direction measure-ment capability of the interferometer was not used. Instead, the precision X, Y movement and sample stage 53 position readouts were used. A transmission microscope was also used for qualitative assessment of hole consistency and overall pattern quality.

For DP A 70, the average fabricated hole diameter is 10.4±0.4 μm, which is within 10% of the 10.5 μm target. The hexagonal side length, a, is within 1% of the 42.0 μm specification. Images of fabricated of sections of DP A 70 were obtained and it was determined from the images that those fabricated sections meet the design specifications given in Table 1. The images also showed that the holes are close to circular and, more importantly, highly consistent in shape and size.

For DP B 81, the average diameters in X and Y, shown in Table 3, are 23.3±0.8 μm and 23.4±2.0 μm respectively, which are about 10% smaller than the target of 26.6 μm. The average ellipticity is 1±0.1. Optical testing results for DP B 81 were obtained from NASA Ames Research Center, which analyzed a subsection of the final printed hole pattern. Fabrication of DP B 81 required that the entirety of the pattern be printed on a significantly sloped area of the mirror substrate. In addition to meeting the specifications for hole diameter and hexagonal side length, hole uniformity is important to maintain across the print area where cosine error distortions begin to manifest due to higher slope. FIG. 10 is a plot of the X and Y hole diameters in microns as a function of radial distance in mm from the center of the substrate. Notable increases in diameter appear at the edge of the print area farthest from center, with the Y diameter increasing at a faster rate and causing a slightly elliptical hole shape. DP B 81 is slightly outside of the original specification, but the 10% tolerance on hole diameter was later determined by NASA to be unnecessarily tight based on the optical performance of DP B 81.

The largest printed pattern, DP C 90, relied on the use of stitched exposure in order to produce the entirety of the pattern. Stitching alignment was calibrated and adjusted down to a total stitching error of less than 1 μm. The average hole diameter was 11.0 μm±1.0 μm, which is 5% larger than the desired 10.5 μm, with a hexagonal spacing of 42 μm within 1%, making it within specification. No stitching seams were detectable between the four exposure quadrants.

FIG. 11 is a flow diagram that represents the MLP for forming the preselected diffractive pattern of the DOE in accordance with a representative embodiment. A freeform optical surface having a reflective layer is provided, as indicated by block 111. This step assumes that the freeform optical surface is fabricated as part of a process that is separate from the process of forming the preselected pattern. For example, in the case where the freeform optical surface is an aspheric convex or concave mirror, the mirror may be purchased from a commercial manufacturer of mirrors that fabricates the mirror to have preselected characteristics. One of the most recent implementations by the inventors was directed to fabricating the optical element 80 shown in FIG. 8, which involved patterning of an off-axis circular region (DP B 81) for the diffractive pattern on a commercial telescope secondary mirror 82 pulled from a Cassegrain telescope. As indicated above, the mirror was a convex aspheric surface with a 69 millimeter (mm) diameter, a primary radius of curvature of-723 mm, and an aspheric constant of −7.166. Being a commercial mirror, the aluminum layer deposited by the manufacturer was protected by a strong dielectric layer that could not be etched. Placement of an additional aluminum layer on top of this dielectric layer would not provide high contrast because the etched aluminum holes would still allow light to transmit through the protective layer to the manufacturer's aluminum layer and high reflectivity would still occur. This would provide almost no contrast.

As indicated above with reference to FIG. 8, the solution to this issue was to add a layer of low reflectivity material on top of the manufacturer's protective dielectric layer, followed by a layer of material of high reflectivity, such as a layer of aluminum, followed by the photoresist later to be patterned. For this purpose, the aforementioned Blue Chrome layer from Telic Inc. was used as the layer of low reflectivity material, although any suitable material of low broadband reflectivity that is minimally reactive to the etching acid used to etch the metallic reflective layer could be used for this purpose. Thus, a layer of Blue Chrome followed by Aluminum followed by photoresist was deposited via contract with Telic Inc. This allowed for off-axis printing of the preselected diffractive pattern, i.e., the DP, with high contrast. Therefore, in accordance with this representative embodiment, the freeform optical surface with the reflective layer provided at the step represented by block 111 had the structure shown in FIG. 12A, i.e., an aluminum layer 121, having the protective layer 122 on top of it, a layer of Blue Chrome 123 disposed on top of the protective layer 122, and a layer of aluminum 124 disposed on top of the layer of Blue Chrome 123. However, the freeform optical surface that is used at step 111 could simply be, for example, a layer of reflective metal (e.g., aluminum) having a suitable thickness and freeform shape.

At the step represented by block 112 shown in FIG. 11, a layer of photoresist 125, which is shown as being AZ 1500 photoresist in this representative embodiment, is formed on top of the reflective layer 124, as shown in FIG. 12B. This step typically is performed by using a spin coating process followed by a soft bake process. At the step represented by block 113, the MLT described above with reference to FIGS. 4A and 4B and the flow diagram in FIG. 7 patterns the photoresist layer 125 in X-, Y- and Z-directions of an X, Y, Z Cartesian coordinate system to form a photoresist mask that leaves preselected portions of the reflective layer unmasked and preselected portions of the reflective layer masked. As part of the process represented by block 113, the post-exposure bake process and a wet development process described above are used to remove the exposed portions of the photoresist layer 125. At the step represented by block 114, the unmasked portions of the reflective layer are etched to form the diffractive pattern in the reflective layer at a preselected location (e.g., the holes in the reflective layer described with reference to FIGS. 2A-2C). This step is typically performed by using an acid wet etching process to etch the unmasked portions of the reflective layer followed by a rinse process.

At the step represented by block 115, the photoresist mask is removed to uncover unetched portions of the reflective layer. In the representative embodiment, aluminum was used as the reflective layer. The locations where the aluminum was removed provide low reflectivity (~4%) compared to the high reflectivity (~99%) of the aluminum surface. Thus, very high contrast is achieved. Maximum contrast is desired for performance.

It should be noted that the MLP described above with reference to FIG. 11 may have additional steps or fewer steps that what is shown in FIG. 11. It should also be noted that although the MLP is preferably used to form the preselected diffractive pattern on the freeform optical surface, the optical devices described herein may be formed by any suitable process capable of forming the preselected diffractive pattern with the desired level of precision.

Many variations of the preselected diffractive pattern can be achieved using the MLT and MLP described herein. For example, the preselected diffractive pattern may be designed to diffract more or less strongly in certain wavelength bands. This could be achieved by, for example, forming the pattern in multiple layers of metal having different levels of reflectivity, e.g., a layer of high-reflectivity metal (e.g., aluminum) and a layer of low-reflectivity metal. It should also be noted that the preselected diffractive pattern may be a phase pattern. It should also be noted that while the representative embodiments have been described with reference to the freeform optical surface having a reflective surface on which the preselected diffractive pattern is formed of holes that do not reflect light, the freeform optical surface may instead be a transmissive optical surface and the preselected diffractive pattern may be designed to reflect light at preselected locations on the transmissive surface.

FIG. 13 shows a schematic diagram of an example of an astrometry system 130 that incorporates an optical device such as, for example, one of the optical devices described above with reference to FIG. 1, 6, 8 or 9, for example, comprising a curved mirror having an off-axis DP formed thereon in the manner described above. For demonstrative purposes, it will be assumed that the astrometry system 130 incorporates the optical device 80 shown in FIG. 8. In accordance with this embodiment, the astrometry system 130 is employed in conjunction with a high-contrast telescope configured to perform exoplanet astrometry.

In accordance with a representative embodiment, the astrometry system 130 includes a processing device 150 that is configured to perform a correction algorithm that corrects star field motion images captured by the telescope. The CCDs 143 and 148 comprise an image detection system that acquires star field motion images collected with a telescope that incorporates the optical device. The processing device 150 processes the diffractive spikes (FIG. 3) generated by the preselected diffractive pattern to measure the diffractive spikes. The processing device 150 executes an image correction algorithm that corrects the acquired star field motion images based on the measured diffractive spikes. The processing device 150 includes one or more non-transitory computer-readable mediums (e.g., a solid state memory device) that store computer software and/or firmware executed by processing logic of the processing device 150 to perform the image correction algorithm.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. An optical device, comprising:

a freeform optical surface, wherein the freeform optical surface comprises a reflective surface, the freeform optical surface is a three-dimensional (3-D) surface that extends in X-, Y- and Z-directions of an X, Y, Z Cartesian coordinate system, the 3-D surface is a non-spherical, non-planar surface, and the freeform optical surface is an aspherical mirror; and a preselected two-dimensional (2D) diffractive pattern disposed on the freeform optical surface, where the preselected 2D diffractive pattern varies in two dimensions across the freeform optical surface, where the freeform optical surface is not in an image plane of the optical device and an area of the freeform optical surface comprising the preselected 2D diffractive pattern does not reflect light from other surfaces of an optical system including the optical device more than once, wherein the preselected 2D diffractive pattern is disposed on the reflective surface at a preselected location, and the preselected location at which the preselected 2D diffractive pattern is disposed is off-axis relative to an optical axis of the aspherical mirror, and wherein the preselected 2D diffractive pattern is disposed on a primary mirror surface of the aspherical mirror.

2. The optical device of claim 1, wherein the aspherical mirror is a convex aspherical mirror and the preselected 2D diffractive pattern is disposed on a primary mirror surface of the aspherical mirror.

3. The optical device of claim 1, wherein the aspherical mirror is a concave aspherical mirror and the preselected 2D diffractive pattern is disposed on a primary mirror surface of the aspherical mirror.

4. The optical device of claim 1, wherein the preselected 2D diffractive pattern is configured to generate diffractive spikes that are acquired by an image detection system, and wherein measurements of the diffractive spikes are used to correct star field motion images collected by a telescope having an optical pathway along which the aspherical mirror is positioned, the star field motion images acquired by the image detection system along with the diffractive spikes.

5. The optical device of claim 4, wherein the preselected 2D diffractive pattern comprises an array of hexagons with each hexagon of the array being defined six holes located at six vertices of the respective hexagon, each hole having a center and a circumferential edge that surrounds the respective center, at least the center of each hole being non-reflective to light of a wavelength of interest, and wherein surface areas of the preselected 2D diffractive pattern that surround the holes are reflective to the light of the wavelength of interest.

6. The optical device of claim 5, wherein the holes have a diameter that is equal to between 20 and 30 micrometers (microns).

7. The optical device of claim 6, wherein adjacent holes defining each respective hexagon are separated by a distance that is equal to between 110 and 150 microns.

8. An optical device, comprising:

a freeform optical surface; and a preselected two-dimensional (2D) diffractive pattern disposed on the freeform optical surface, where the preselected 2D diffractive pattern varies in two dimensions across the freeform optical surface, where the freeform optical surface is not in an image plane of the optical device and an area of the freeform optical surface comprising the preselected 2D diffractive pattern does not reflect light from other surfaces of an optical system including the optical device more than once, wherein the preselected 2D diffractive pattern comprises an array of hexagons with each hexagon of the array being defined six holes located at six vertices, respectively, of the respective hexagon, each of the holes having a center and a circumferential edge that surrounds the respective center, at least the center of each hole being non-reflective to light of a wavelength of interest, and wherein surface areas of the preselected 2D diffractive pattern that surround the holes are reflective to the light of the wavelength of interest.

9. The optical device of claim 8, wherein the freeform optical surface is an optically transmissive surface.

10. The optical device of claim 8, wherein the freeform optical surface comprises a reflective surface.

11. The optical device of claim 8, wherein the freeform optical surface comprises a reflective surface, and wherein the preselected 2D diffractive pattern is disposed on the reflective surface at a preselected location.

12. The optical device of claim 11, wherein the freeform optical surface is a three-dimensional (3-D) surface that extends in X-, Y- and Z-directions of an X, Y, Z Cartesian coordinate system.

13. The optical device of claim 12, wherein the 3-D surface is a non-spherical, non-planar surface.

14. The optical device of claim 13, wherein the freeform optical surface is an aspherical mirror.

15. A method for correcting star field motion images when performing astrometry, the method comprising:

with an image detection system, acquiring star field motion images collected with a telescope, the telescope having an optics system that includes an aspherical mirror with a preselected two-dimensional (2D) diffractive pattern located off-axis relative to an optical axis of the aspherical mirror, the preselected 2D diffractive pattern being on a primary mirror surface of the aspherical mirror, where the preselected 2D diffractive pattern varies in two dimensions across the primary mirror surface, where an area of the primary mirror surface comprising the preselected 2D diffractive pattern does not reflect light from other surfaces of the optics system more than once, and wherein the preselected 2D diffractive pattern generates diffractive spikes that are acquired by the image detection system along with the star field motion images;

with a processing device, processing the acquired diffractive spikes to measure the diffractive spikes; and with the processing device, executing an image correction algorithm that corrects the acquired star field motion images based on the measured diffractive spikes.

16. The method of claim 15, wherein the preselected 2D diffractive pattern comprises an array of hexagons with each hexagon of the array being defined six holes located at six vertices, respectively, of the respective hexagon, each of the holes having a center and a circumferential edge that surrounds the respective center, at least the center of each hole being non-reflective to light of a wavelength of interest, and wherein surface areas of the preselected 2D diffractive pattern that surround the holes are reflective to the light of the wavelength of interest.

* * * * *